United States Patent [19]
Pugh

[11] Patent Number: 5,870,888
[45] Date of Patent: Feb. 16, 1999

[54] LAWN GROOMING AND ROLLING ACCESSORIES FOR LAWN MOWERS

[76] Inventor: John F. Pugh, 747 E. Beaver Ave. #106, State College, Pa. 16801

[21] Appl. No.: 854,848

[22] Filed: May 12, 1997

[51] Int. Cl.$^6$ .................................................... A01D 34/82
[52] U.S. Cl. ............................................. 56/16.7; 56/17.4
[58] Field of Search .................................... 56/16.7, 17.4, 56/255, 295, 294

[56] References Cited

U.S. PATENT DOCUMENTS

| | | |
|---|---|---|
| 261,638 | 7/1882 | Stanly . |
| 2,484,795 | 10/1949 | Schofield . |
| 2,520,488 | 8/1950 | Batchelder ............................... 56/16.7 |
| 2,836,949 | 6/1958 | Cole et al. ............................ 56/16.7 X |
| 2,973,613 | 3/1961 | Hagedorn ............................... 56/6.7 X |
| 3,176,454 | 4/1965 | Jepson et al. .............................. 56/294 |
| 3,203,160 | 8/1965 | Thomas . |
| 3,555,793 | 1/1971 | Chapman .................................. 56/17.4 |
| 3,903,716 | 9/1975 | Farkas . |
| 4,208,151 | 6/1980 | Cross . |
| 4,481,757 | 11/1984 | Tsuchiya . |
| 4,638,622 | 1/1987 | Smith ....................................... 56/17.4 |
| 5,261,213 | 11/1993 | Humphrey . |

Primary Examiner—Heather Shackelford
Attorney, Agent, or Firm—Laurence R. Brown

[57] ABSTRACT

This invention provides improved lawn rolling equipment for grooming lawns. To resolve the "Lazarus" effect of recovery of bent over grass stems that make a freshly mowed lawn look unkempt and ragged, a lawn mower accessory is provided with a roller that is manually bistably positioned between a rolling-on-the-lawn-surface working position and a retracted-off-the-lawn-surface idling position so that mowing may be selectively performed with or without the accompanying rolling step. The prior art has not provided simple, inexpensive equipment, such as here provided, that can improve the appearance of lawns even when double mowed by the criss-cross method because there is a higher probability of removing unwanted grain and uneven grass lengths caused by grass stems bent in one direction by the rolling that revive after mowing to introduce graininess and untidiness. This invention overcomes prior art problems introduced by fully engaged lawn rollers carried by lawn mowers and those spring biased downwardly into the lawn, which facilitate scalping or the temporary bending and creasing of grass stems which thereafter revive to provide a grain and unkempt appearance that is particularly intolerable on golf greens or formal gardens, for example.

8 Claims, 2 Drawing Sheets

LAWN GROOMING AND ROLLING ACCESSORIES FOR LAWN MOWERS

TECHNICAL FIELD

This invention relates to lawn mowing methods and apparatus, and more particularly it relates to grooming of lawns by roller accessories carried by lawn mowers.

BACKGROUND ART

It has long been known that the rolling of lawns is beneficial in grooming lawns for both short term and long term benefits. It is particularly important to roll lawns in such critical areas as golf greens and formal gardens, etc.

However the prior art is deficient in several ways. Roller attachments carried by lawn mowers, either power driven or manually pushed tend to complicate the machinery and significantly increase the cost of the mowers. Although some large and expensive commercial mowers may provide lawn rollers, it is particularly difficult to find roller attachments for small-sized, hand-steered-from-the-rear types of lawn mowers of the kind that are quite useful for homes and in small grassy areas of golf greens or formal gardens. The smaller inexpensive mowers that are in use for home lawns have not conventionally had any provisions for attachment of roller accessories.

As a matter of fact, even when rollers are provided on lawn mowers they may be detrimental to lawn grooming rather than beneficial. That is because there is rarely any provision for mowing without rolling at the same time. Conventionally the rollers themselves have constituted the mower drive wheels in power driven mowers, for example.

Such mowers with fixed in place rollers under some widely used methods of cutting and grooming lawns tend to end up with an unkempt appearance and a grainy structure that is unacceptable for example on golf greens. Consider the problems they introduce when the special grooming method of double mowing in criss-cross patterns is used to reduce the graininess caused in particular when mower rotary blades get dull or under other special conditions causing the blades to knock over the grass stems temporarily, so that they can later by the "Lazarus" effect revive and destroy the effect of an evenly trimmed grass length, or a carefully groomed grain pattern, so important for example on golf greens.

Consider the adverse role that the continuously engaged lawn roller has in this respect. In the first of two swaths in the popular criss-cross double-cut pattern, if a roller is used it tends to crease the grass stems which are not cut off against the ground long enough that the second swath does not encounter stiffly standing grass stems that cuts evenly and completely. Thus the end result is not likely to be evenly trimmed grass having a constant known height and grain pattern.

Also consider the effect of a roller that encounters a rock, a root or a small sized mound in the lawn surface. If that roller is firmly attached to the lawn mower body or is spring biased thereto to press down upon the lawn surface, the tendency is for the mower body to tilt and unevenly scalp the grass with rotary blade type mowers.

Furthermore, roller type mowers tend to be factory designed and therefore are quite expensive special purpose lawnmowers with a high cost which is out of reach to the large mass of homeowners. Thus, inexpensive roller mounts and preferably those that might be retrofit upon existing hand steered mowers of the type used by home owners are not found in the prior art.

Accordingly it is a general object of this invention to improve the state of the art by overcoming the aforesaid problems of the prior art.

DISCLOSURE OF THE INVENTION

This invention provides improved lawn rolling equipment for grooming lawns.

It is a general objective of the present invention to improve the functional performance of lawn mowers that carry lawn rollers.

A more specific object is to provide operator controlled equipment for selectively permitting a lawn to be rolled when mowing.

Other objects, features and advantages of the invention will be found throughout the following description, claims and drawings.

For example, to resolve the "Lazarus" effect of recovery of grass stems bent over by the roller that make a freshly mowed lawn look unkempt and ragged, a lawn mower accessory is provided with a roller that is manually actuated into bistable positions where the roller may be retracted into an off-the-lawn position so that mowing may be done under control of the operator with or without the accompanying rolling step, to thus eliminate the rolling step when undesirable or not effective.

The prior art has not provided simple, inexpensive equipment, such as here provided, that can improve the groomed condition of lawns double mowed by the criss-cross method with more probability of removing grain and uneven grass lengths caused by grass stems that are bent over temporarily by a first rolling step to revive and straighten up after mowing has terminated. In such cases the prior art fully engaged lawn rollers carried by lawn mowers facilitate the temporary bending and creasing of grass stems which tend thereafter to revive with a grain and unkempt appearance that is particularly intolerable on golf greens, for example. Thus, the mower provided by this invention permits the operator to selectively move the roller into bistable positions off and on the lawn dynamically as the lawn is being mowed, thereby permitting criss-cross double-mowing without producing creased grass stems with the roller in the first pass over the lawn.

In a preferred embodiment of the invention, a lawn roller assembly may be retrofit upon an inexpensive steer-from-behind mower. Thus a pivotable bracket assembly attaches lever arms to each end of the roller and pivotably mounts the roller upon the mower frame. A cable attached to one lever arm roller junction is movably secured to move along the mower handle assembly to its other end, which is attached to a bistable position latching lever located on the mower handle for ready manual access by the operator as the lawn is being mowed.

The pivotable bracket permits the roller to rest upon the lawn surface by weight of gravity. Thus the roller can conform to aberrations in the contour of the lawn surface without a tendency to tilt the mower frame in a manner that could scalp the lawn.

BRIEF DESCRIPTION OF THE DRAWING

In the accompanying drawings, wherein like reference characters refer to similar features throughout the several views.

THE PREFERRED EMBODIMENTS

Figure 1:
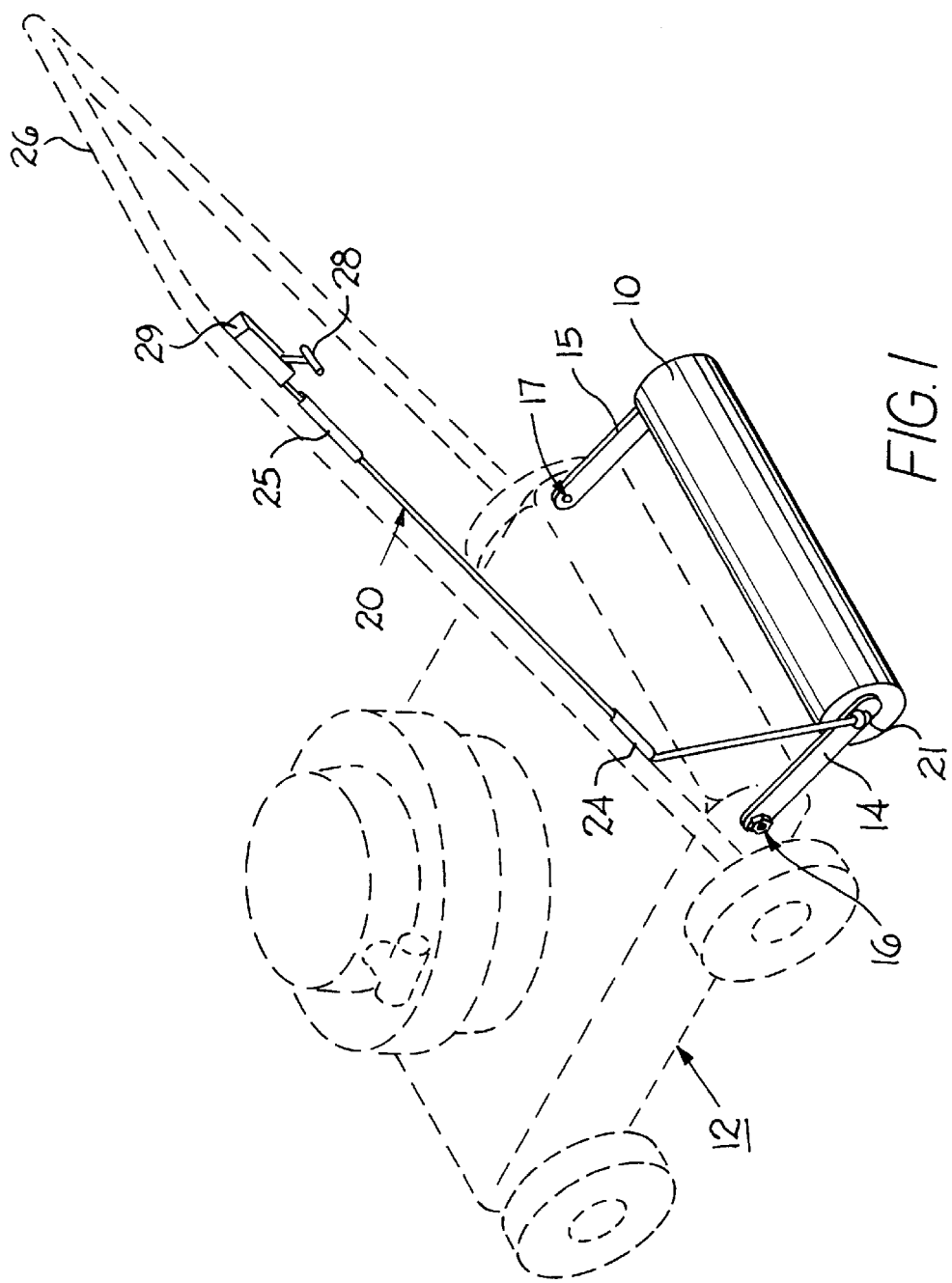
FIG. 1 is a perspective sketch of a retrofit lawn rolling accessory embodiment of the invention for a steered from behind inexpensive home type lawn mower.

FIG. 1 illustrates the simple mechanism afforded by this invention to convert or retrofit an inexpensive home lawn type mower 12 into a lawn grooming appliance by pivotably mounting upon the movable framework of the mower a weighted lawn roller 10. The roller 10 is positioned at the rear of the lawnmower 12 for rolling the lawn after it is mowed thereby to prevent any roller effect of bending or creasing the stems in a manner that could invite later recovery into a standing position making the lawn untidy or giving it a random or unplanned grain structure.

The ends of the roller 10 are journalled to respective pivot lever arms 14, 15, which in turn are journalled at pivot points 16, 17 to the framework of mower 12. Thus, without constraints provided by the cable 20 attached to a fitting 21 at one end of the roller 12, the roller freely pivots to ride upon the lawn surface by force of gravity.

However during the course of mowing a lawn, the bistable position of the roller 10 is under control of the operator for pivotal movement into a retracted state latched in position off the lawn surface so that the mower is permitted to mow the lawn without rolling it simultaneously. For this purpose the cable 20 freely slides in collars 24, 25 affixed to one side rod of the handle assembly 26. Thus the manually accessible control lever 28 moves the roller into two bistable positions respectively riding on the lawn surface and retracted into a latched position off the lawn surface by means of a latching detent device in the control box 29. The phantom showing of the mower 12 emphasizes the retrofit nature of the roller accessory in an inexpensive and substantially universal format that can be simply adapted to fit many varieties of commercial mowers in the marketplace.

Figure 2:
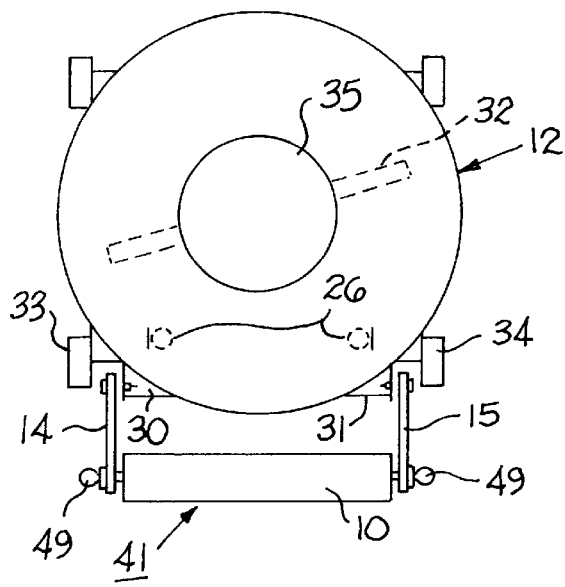
FIGS. 2 and 3 are respectively top view and side view sketches of a typical inexpensive lawn mower embodying the bistably positioned lawn roller accessory provided by this invention.
Figure 3:
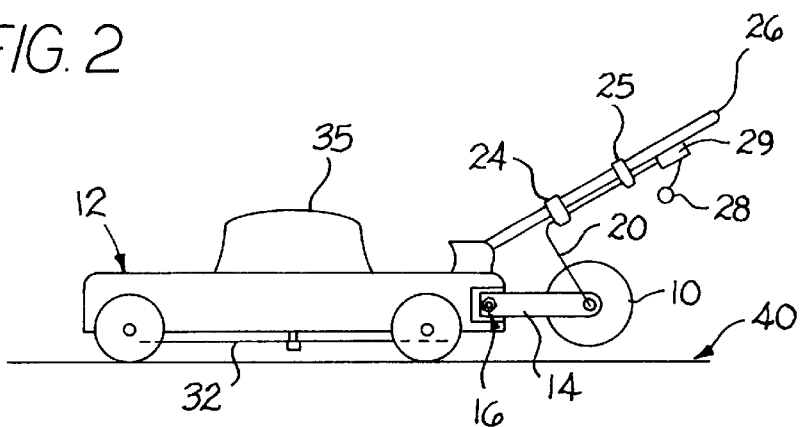

The embodiment shown in FIGS. 2 and 3 is mounted by means of a set of brackets 30, 31 affixed to the framework of lawnmower 12 having a rotary cutting blade 32 driven by a motor 35 at a position that does not interfere with the rear wheels 33, 34. As shown in FIG. 3, the roller 10 is retracted into a stable latched position that pivots it up and away from the lawn surface 40, thus permitting the mower to mow grass either: (1) in the mowing mode of operation only, or (2) in the rolling and grooming mode of operation at the will of the operator. For manipulation of the handle 28, it is positioned in a handy position for use by the operator as the lawn is being mowed and the operator steers the mower by way of the handle 26 extending from the rear of the mower 12.

Figure 4:
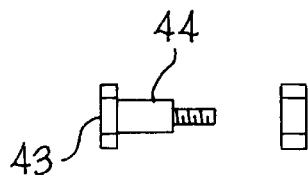
FIGS. 4 and 5 illustrate mounting hardware for pivoting the lawn roller from a trailing edge of a lawn mower body.
Figure 5:
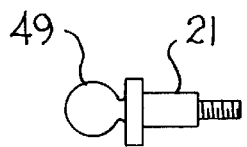

FIGS. 4 and 5 show typical simple journalling hardware for mounting the pivotable roller lever assembly 41. Thus, the pivot bolt 43 has a journalling shank 44 that mates into the levers 14, 15 at the lawnmower body end. This bolt is simply affixed to the brackets 30, 31 by means of nut 45 and accompanying lock washer or the like. The corresponding journalling pivot bolt 21 has the eyelet 49 for attachment of the cable 20 to the roller mechanism for its pivotal movement between the bistable positions on and off the lawn.

An equivalent operator controlled bistable mount may be made upon other mower arrangements including power driven or riding mowers to give the operator control of two modes of mower operation, namely mowing only and grooming by combined mowing and rolling.

Figure 6:
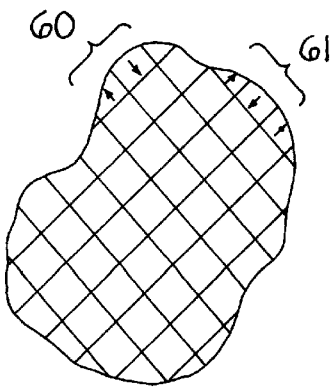
FIG. 6 is a sketch illustrating the double-mowing criss-cross pattern of lawn mowing for providing and evenly cut groomed lawn.

To better understand the improvement in grooming a lawn afforded by this invention, reference is made to FIG. 6, which represents an isolated section of a lawn that has been mowed in a double-mowed criss-cross mowing pattern. The arrows 60 thus represent the direction of mower movement back and forth in a first cutting pattern slanted between upper left and lower right. A second cutting pattern as represented by arrows 61 illustrates the direction of a mower moving back and forth in the columns slanted between lower left and upper right.

If the first pass of this double pass mowing method is done with the roller, there would be a tendency to bend over and crease grass stems. Some of these stems, then can revive after the second mowing pass is completed and result in untidy appearance and can introduce an unplanned grain structure defeating the purpose of criss-cross mowing patterns in both establishing a known grain pattern and uniform grass length. Thus, with the bistable positionable lawn roller provided by this invention, the operator may adjudge the proper times for using the roller and for cutting without rolling.

It is to be recognized therefore that the state of the art is advanced by this invention and therefore those features of novelty representative of the nature and spirit of the invention are set forth with particularity in the following claims.

I claim:

1. A walk behind manually steered lawn mower and accompanying attachment for grooming a lawn with a weighted roller, comprising in combination:

a lawn mower body with a pushing handle mounted thereon near a trailing edge to extend behind the mower for manually steering the lawn mower, a weighted roller for rolling on lawn grass by the weight of gravity to groom the grass, a pivoting mount assembly including pivot lever means for attaching the roller on the mower body to extend the roller a predetermined distance behind the mower body for pivotably resting said roller upon the lawn by force of gravity exerted upon said weighted roller when pivoted into a first stable position disposing the pivot lever means at an acute angle from vertical, and a manually selectable latching retraction mechanism arranged on the pushing handle for selectively moving the pivot lever to a position lifting the roller off the lawn into a second stable retracted position as the mower is being pushed.

2. The lawn rolling accessory of claim 1 wherein said pushing handle comprises a pair of mounting rods attached to the mower body near opposite sides, wherein said retraction mechanism comprises a cable movably mounted alongside a selected one of the mounting rods, and wherein said selectable latching retraction mechanism is coupled to said cable and is affixed to said selected mounting rod.

3. The lawn rolling accessory of claim 1 wherein said pivoting mount assembly comprises a parallel set of brackets having one end pivotably coupled to opposite ends of the roller and the other ends pivotably coupled to the mower body.

4. A lawn rolling grooming accessory for a lawn mower, comprising in combination:

a weighted roller for rolling a lawn of a predetermined weight sufficient to groom the lawn, pivoting means for pivotably mounting the weighted roller on the back of a lawn mower to rest at a pivoted angle from horizontal by the force of gravity on a lawn with substantially a constant weight disposed to groom the lawn, and selectively manually actuated retraction means for pivoting the roller off the lawn and latching said roller in a stable retracted position off the lawn to be carried by the mower for actuation when mowing the lawn with the lawn mower to selectively groom the lawn.

5. The lawn rolling accessory of claim 4 in a kit for retrofitting a particular style of lawn mower.

6. The lawn rolling accessory of claim 4 attached to a lawn mower body, wherein the pivoting means consists of two pivot lever arms journalled respectively to opposite ends of said roller and the lawn mower body for positioning the roller behind a trailing edge of the mower body.

7. The lawn rolling accessory of claim 4 fitted to a lawn mower body having a manually operated steering handle extending rearwardly from the mower body, wherein the retraction means comprises a manually actuated lever for moving the roller from the lawn to said retracted position and a cable connected between said pivoting means and the manually actuated lever.

8. A lawn grooming appliance comprising in combination:

a movable appliance framework for moving over the surface of a lawn under manual control of an operator, a lawn mowing mechanism mounted on the framework for mowing the lawn, a lawn rolling mechanism pivotably mounted on the framework with a weighted roller disposed in a first stable position at a predetermined acute pivot angle from horizontal for rolling upon the lawn surface to exert sufficient weight to evenly groom the lawn after being mowed by the lawn mowing mechanism, and bistable manually operable roller retraction means selectively operable during mowing of the lawn for lifting and latching the roller selectively during mowing of the lawn into a second stable position off the lawn surface for operation of the appliance solely as a lawn mower, wherein the lawn rolling mechanism positions the roller on the lawn surface solely by the force of gravity exerted upon the weighted roller.

* * * * *